(12) United States Patent
Wang et al.

(10) Patent No.: US 9,285,894 B1
(45) Date of Patent: Mar. 15, 2016

(54) MULTI-PATH REDUCTION FOR OPTICAL TIME-OF-FLIGHT

(71) Applicant: RAWLES LLC, Wilmington, DE (US)

(72) Inventors: Eric Wang, Cupertino, CA (US); Renwei Yan, Sunnyvale, CA (US); Christopher David Coley, Morgan Hill, CA (US); Ronald Joseph Degges, Jr., Los Gatos, CA (US); Louis Leroi Legrand, III, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 234 days.

(21) Appl. No.: 13/902,320

(22) Filed: May 24, 2013

(51) Int. Cl.
*G01C 3/08* (2006.01)
*G06F 3/03* (2006.01)

(52) U.S. Cl.
CPC .................... *G06F 3/0304* (2013.01)

(58) Field of Classification Search
CPC .............................. G01C 3/08; G06F 3/0304
See application file for complete search history.

(56) References Cited

U.S. PATENT DOCUMENTS

| | | | |
|---|---|---|---|
| 2006/0197014 A1* | 9/2006 | Inuiya | 250/239 |
| 2006/0228818 A1* | 10/2006 | Chacin et al. | 438/18 |
| 2011/0225383 A1* | 9/2011 | Rankl | 711/163 |
| 2013/0237811 A1* | 9/2013 | Mihailescu et al. | 600/424 |

OTHER PUBLICATIONS

"Albedo". The Encyclopedia of Earth. Published May 8, 2010. http://www.eoearth.org/view/article/149954/.*

* cited by examiner

*Primary Examiner* — Luke Ratcliffe
*Assistant Examiner* — Samantha K Abraham
(74) *Attorney, Agent, or Firm* — Lindauer Law, PLLC (57) ABSTRACT

Described herein are systems and devices for mitigating multi-path interference in optical time-of-flight systems. An input surface is configured with a pattern comprising predominately low albedo material and a plurality of decimated high albedo features. The low albedo material is configured to minimize reflectance of light emitted by an emitter. The high albedo material is configured to reflect more of the light than the low albedo material. The low and high albedo materials, or an additional material, may be used to provide a high albedo material in visible light wavelengths, configured for use as a projection surface.

20 Claims, 8 Drawing Sheets

MULTI-PATH REDUCTION FOR OPTICAL TIME-OF-FLIGHT

BACKGROUND

Optical time-of-flight ("ToF") systems are used to determine a distance to one or more objects in an environment. These systems may be susceptible to multi-path interference which may degrade accuracy.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Optical time-of-flight ("ToF") systems provide a compact and high-resolution way to determine distances to one or more objects in an environment. During operation, an optical ToF system sends emitted light which reflects off of the one or more objects. A detector senses returning light of these reflections. Given the constant propagation velocity of light and based on an amount of time between emission and return, distance to the one or more objects can be calculated. By sampling a number of different points or areas, a depth map may be generated.

Optical ToF systems may be used as part of input devices. For example, the optical ToF system may be configured to recognize hand gestures, direction a hand is pointing, position of fingers and so forth. Conventional optical ToF systems may generate erroneous results due to multi-path interference. Multi-path interference ("MPI") occurs when some of the emitted light reflects off of two or more different surfaces of one or more objects, before being returned to the detector. With different rays of light from adjacent areas reporting different delays due to relatively shorter or longer paths, the resulting depth map may not be representative of the actual environment.

Described in this disclosure are devices having input surfaces which reduce or eliminate optical multi-path effects. The input surface works in conjunction with a ToF system to support detection of user input such as a gesture, movement, or presence of an object. Also described are techniques to generate and use those input surfaces in optical ToF systems. Furthermore, the input surface may be configured to act as a projection surface, such that visible light images may be projected thereon and presented to the user.

The input surface comprises a pattern which includes two sets of features. A first set are low albedo features which are optically absorptive to the emitted light used by the ToF system. A second set of features are high albedo features which are optically reflective to the emitted light used by the ToF system. The pattern is predominately made up of the first set of features which are optically absorptive, with a relatively sparse set of the optically reflective features. The optically absorptive features absorb or reflect only a small portion of the emitted light, resulting in little or no returning light from those features. The optically absorptive features may also be reflective in wavelengths other than the emitted light. In comparison, the optically reflective features reflect a significant portion of the emitted light, returning a strong signal. In one implementation, the first set of features may be grid blocks while the second set of features are gridlines between the grid blocks, forming a sparse grid.

Multi-path interference resulting from objects between or adjacent to the line-of-sight between the input surface and the emitter are mitigated, because the optically absorptive features absorb many of the multi-path reflections. For example, a user's hand may be above the input surface, with a finger pointing at a particular point on the input surface. The emitted light directly reflects off of the finger providing an accurate depth map of the finger. The emitted light which glances off the side of the finger and impinges on the input surface is predominately absorbed due to the predominately absorptive pattern, as is emitted light which impinges on the input surface. The optically reflective features in the pattern, having been minimized in the pattern, still allow for accurate determination of a pose of the input surface and distance to the reflective features on the input surface, but minimize the amount of emitted light they reflect into objects in the foreground.

The ToF system may use wavelengths of light which are invisible to the human eye. For example, the ToF system may emit infrared or ultraviolet light. In the following examples, the system is described as using infrared light. However, other wavelengths of invisible or visible light may also be used by the ToF system.

The features in the pattern on or in the input surface may be configured to selectively absorb or reflect the wavelengths used by the ToF system. In one implementation where the ToF system uses invisible light such as infrared wavelengths, the input surface is reflective in the visible light wavelengths. This allows the input surface to be used to present a projected image. For example, an image projector may be used to project a projected user interface using visible light onto the input surface. The projected user interface may include one or more user interface input elements such as virtual controls which the user may touch, point, or otherwise gesture at to activate. In another implementation, instead of using a projector, the controls, icons, or other symbols may be printed using ink or other materials which are transparent to the ToF system but visible using visible light wavelengths. The first set of features and the second set of features may thus be present under the visible light printing, but are invisible to the human eye.

The features in the pattern may be printed one atop another, embedded or affixed to a substrate, and so forth. The features may comprise different materials. For example, the first set of features having a low albedo may comprise carbon while the second set of features having a high albedo may comprise aluminum. In other implementations, the features may comprise the same materials, but differently arranged, configured, or otherwise modified to produce a difference in albedo. For example, a common material may have portions exposed to high energy light such as ultraviolet wavelengths to alter the common material and change the albedo of those portions.

Because the input surface mitigates the multi-path interference in the wavelengths used by the ToF system, the depth map may be more accurate. This more accurate depth map may result in higher fidelity input data. As a result, the overall user experience is improved.

Illustrative System

Figure 1:
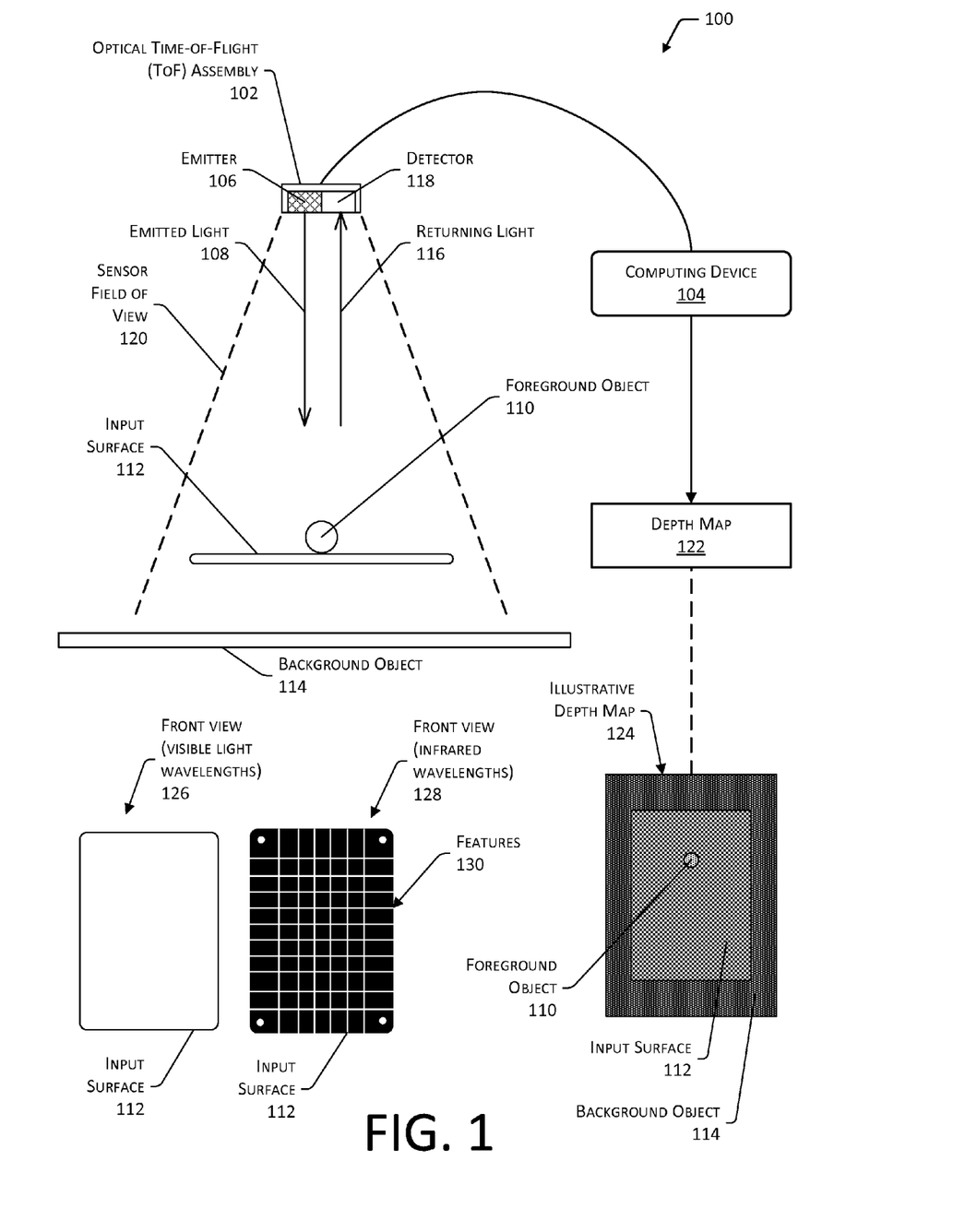
FIG. 1 is an illustrative system including an optical time-of-flight assembly operating in conjunction with an input surface having multi-path reducing features.

FIG. 1 is an illustrative system 100. This system 100 includes an optical time-of-flight ("ToF") assembly 102. The ToF assembly 102 is communicatively coupled to a computing device 104 such that data may be exchanged between the two. The ToF assembly 102 includes at least one emitter 106. The emitter 106 is configured to generate emitted light 108. The emitter 106 may comprise a lamp, light emitting diode ("LED"), laser, and so forth configured to generate the emitted light 108 in a pulse or continuous wave. In some implementations, several emitters 106 may be combined into an array. One or more of phase, amplitude, spectra, and so forth of the emitted light 108 may be modulated. The emitter 106 may be configured to illuminate a relatively large area with the emitted light 108, or may be configured to scan the emitted light 108 across a scene. In some implementations the emitted light 108 may exhibit a peak intensity centered at a wavelength of about 850 nanometers.

The emitted light 108 from the emitter 106 may interact with one or more objects such as a foreground object 110, an input surface 112, or a background object 114. For example, the foreground object 110 may comprise a pointer, at least a portion of a user, such as a hand, finger, arm, and so forth. The input surface 112 as described below in more detail comprises a pattern configured to mitigate optical multi-path interference in the wavelengths used by the ToF assembly 102. One or more background objects 114 may be behind or to the side of the input surface 112.

The emitted light 108 travels from the emitter 106 and interacts with the objects. This interaction may include absorption, reflection, refraction, fluorescence, and so forth. Depending upon the albedo or reflectivity of the objects, at least a portion of the emitted light 108 may be directed back as returning light 116 to a detector 118. The area which is illuminated by the emitted light 108 and which is observable by the detector 118 is illustrated as a sensor field of view 120.

The detector 118 may comprise a single sensor element, such as a single pixel, or may comprise an array configured to generate two-dimensional imaging data. The detector 118 may comprise a charge-coupled device ("CCD"), complementary metal oxide semiconductor ("CMOS"), microbolometer array, avalanche photodiodes, and so forth.

In the process of returning, the returning light 116 may be reflected, refracted, or otherwise experience a path involving multiple interactions with one or more different objects. This path which involves multiple interactions may result in multi-path interference as the detector 118 receives the returning light 116. Multi-path interference is discussed in more detail below with regard to FIG. 2.

The computing device 104 is configured to receive time-of-flight data from the assembly 102. Based on this time-of-flight data, the computing device 104 may generate a depth map 122, or other information which is indicative of one or more attributes of an object including the presence, absence, size, shape, and so forth. In one implementation, the depth map 122 may be expressed as an image of the scene comprising a two-dimensional array of pixels, with each pixel encoding distance information. An illustrative depth map 124 is depicted here, showing the distance to different objects depicted with different shading. In this illustration, the foreground object 110, the input surface 112, and the background object 114 are clearly indicated.

The pixels in the depth map 122 may encode distance information instead of, or in addition to, information such as intensity, color, and so forth. The computing device 104 may process the depth map 122 to determine user input. User input is discussed in more detail below. In some implementations the detector 118 may be configured to acquire a visible light image as well.

Also depicted in FIG. 1 are two front views of the input surface 112, such as illuminated by the emitter 106 and viewed by the detector 118. In this illustration and the subsequent description, the emitted light 108 from the optical ToF assembly 102 is infrared light. However, in other implementations other wavelengths may be used.

A front view in visible light wavelengths 126 of the input surface 112 is depicted. In this illustration, in visible light the input surface 112 appears white. In one implementation, the input surface 112 may also serve as a projection surface, upon which a visible light image may be projected using an image projector. In another implementation, the input surface 112 may have a preprinted design, icons, symbols, and so forth, which are apparent in visible light.

In comparison, a front view in infrared light wavelengths 128 is depicted. The input surface 112, as viewed in the infrared wavelengths, presents two sets of features 130. A first set of features 130 has a low albedo or reflectivity, and is absorptive or minimally reflective in the infrared wavelengths used by the ToF assembly 102. In this illustration, those first set of features 130 appear as black areas. A second set of features 130 has a high albedo or reflectivity, and is highly reflective in the infrared wavelengths used by the ToF assembly 102. In this illustration, the second set of features 130 appear as white areas.

As illustrated here, the input surface 112 is configured to be primarily absorptive or minimally reflective to the infrared wavelengths. By having the first set of features 130 absorbing or minimally reflecting the infrared emitted light 108, less of the emitted light 108 is reflected, reducing multi-path interference. The second set of features 130 being highly reflective, facilitate strong returning light 116 signals. These strong returning light 116 signals improve signal-to-noise ratios of the returning light 116 as detected by the detector 118. This may improve the accuracy of distance determination to different points on the input surface 112. The features 130 are discussed in more detail below with regard to FIG. 3.

Figure 2:
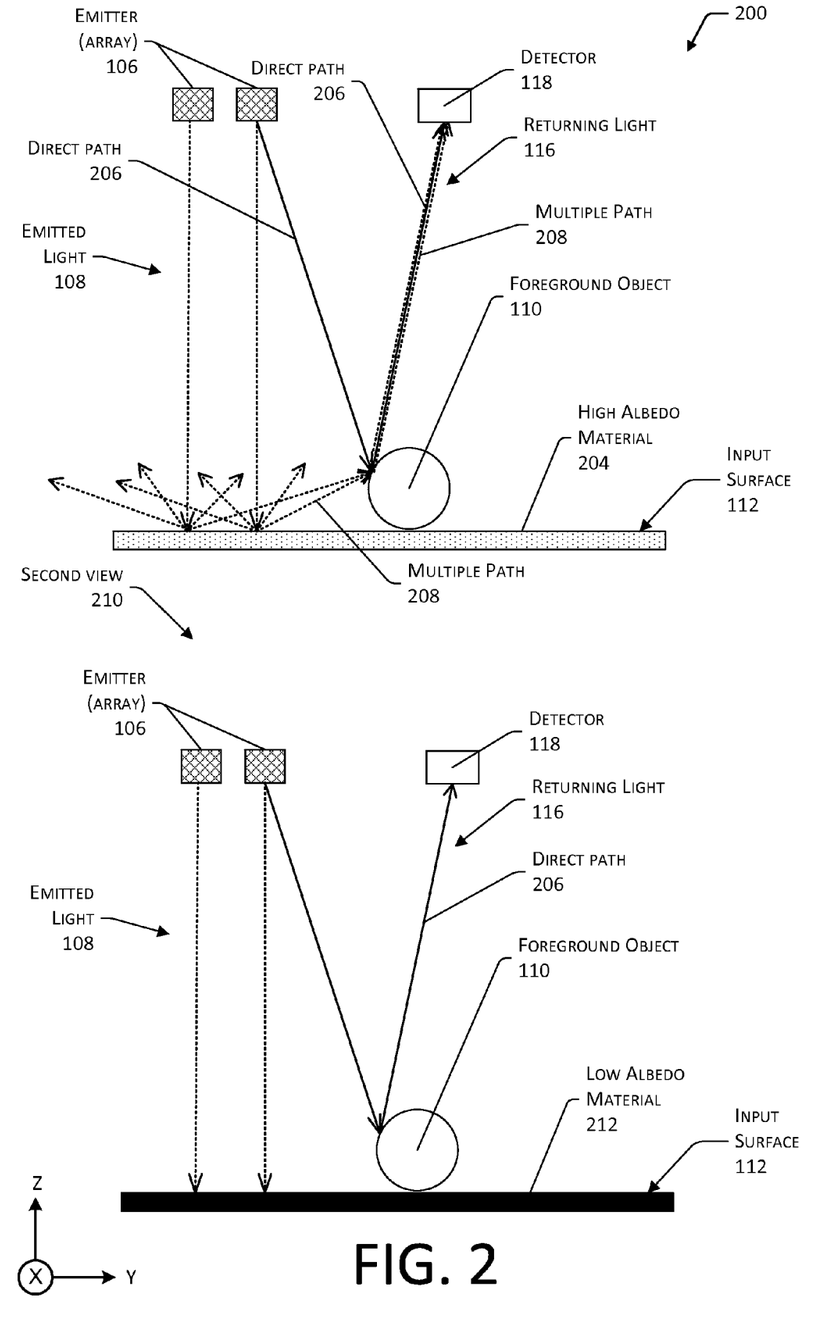
FIG. 2 illustrates optical multi-path interference in optical time-of-flight measurements.

FIG. 2 is an illustrative system 200 depicting optical multi-path interference and mitigation of multi-path interference using a low albedo material. A first view 202 depicts an array of the emitters 106 sending emitted light 108 towards the foreground object 110 and a high albedo material 204. The foreground object 110 is at least partially reflective. For example, the foreground object 110 may comprise a human finger. The emitted light 108 which travels in a direct path 206 is reflected by the foreground object 110 as returning light 116 back to a point on the detector 118. In comparison a multiple path 208, illustrated as dotted lines, depicts some of the emitted light 108 reflected by the high albedo material 204 onto the foreground object. The foreground object 110 in turn reflects the light as returning light 116 to the same point on the detector 118 as the direct path 206. Light rays travelling along the direct path 206 thus have a shorter total path length than those travelling along the multiple path 208. The detector 118 receives the returning light 116 both from the direct paths 206 and the multiple paths 208. Because both are received, the resulting time-of-flight data may contain errors. For example, the distance measured to the foreground object 110 may be incorrectly calculated because of the returning light 116 which has traveled along the multiple path 208.

A second view 210 depicts an array of the emitters 106 sending the emitted light 108 towards the foreground object 110 and a low albedo material 212. The overall configuration in the second view 210 is the same as the first view 202; however the low albedo material 212 is now behind the foreground object 110. In this illustration a portion of the emitted light 108 is reflected along the direct path 206 by the foreground object 110 back towards the point on the detector 118. However, the other emitted light 108 reaches the low albedo material 212 and is absorbed or minimally reflected, such that it is either not returned to the detector 118, or is returned at such a low intensity that the detector 118 disregards the signal. As a result, the multi-path interference is greatly mitigated or eliminated.

The materials used for the high albedo material 204 and the low albedo material 212 may be configured to be reflective in some wavelengths, while being absorptive in others. For example, the low albedo material 212 may be absorptive of the wavelengths of the emitted light 108, but may be reflective of other wavelengths. The high albedo material 212 may comprise metals, retroreflective features, and so forth.

The input surface 112 may comprise one or more of the high albedo material 204 or the low albedo material 212. The foreground object 110 is depicted as being in contact with or resting on the input surface 112 for illustrative purposes, and not by way of limitation. In some implementations the foreground object 110 and the input surface 112 may be separated by some non-zero distance. For example, the user's finger may be in the air above the input surface.

As used herein the high albedo material 204 and the low albedo material 212 may be characterized as diffusely reflecting or Lambertian surfaces, in contrast to a mirror. However, the techniques described herein may be used where the high albedo material 204 comprises a mirror or mirror-like surface.

Figure 3:
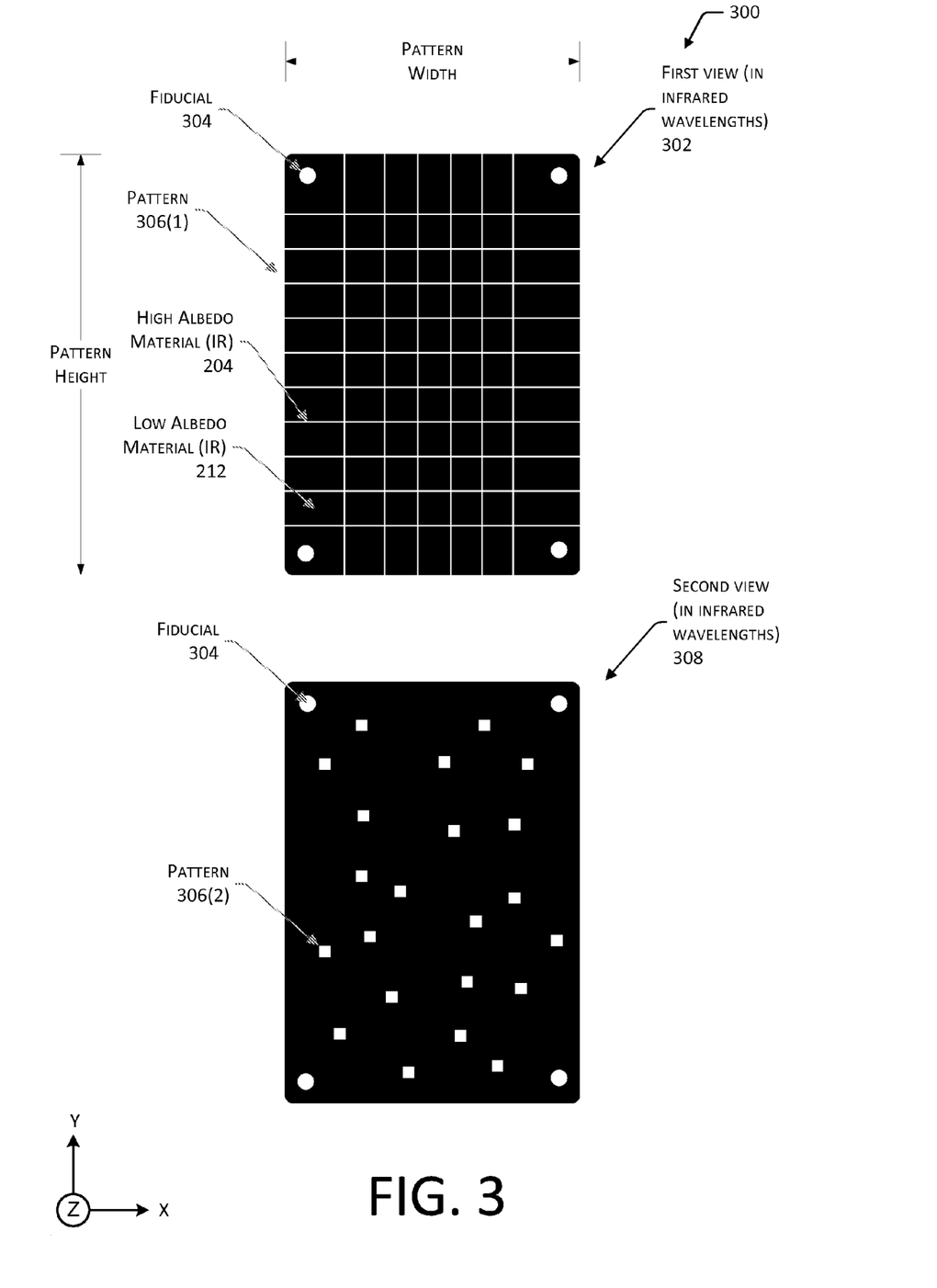
FIG. 3 illustrates patterns for the input surface configured to reduce optical multi-path interference.

FIG. 3 is an illustration 300 of several input surfaces 112 configured to reduce optical multi-path interference. A first view 302 depicts the input surface 112 as viewed in one or more infrared wavelengths used during operation of the ToF assembly 102.

One or more fiducials 304 are depicted at one or more corners of the input surface 112. The fiducials 304 may comprise a high albedo material 204. The fiducials 304 may be positioned at predetermined locations, either relative or absolute, on the input surface 112. The fiducials 304 are configured to be readily detectable by the ToF assembly 102 such that information including distance and pose to the input surface 112 may be readily determined. As used herein, the pose indicates a relative orientation between the ToF assembly 102 and the input surface 112.

The fiducials 304 may be a regular polygon, irregular polygon, irregular shape, and so forth. In some implementations, the fiducials 304 may comprise one or more sub-targets arranged in an asymmetrical fashion, such that distance and pose of the input surface 112 may be determined based on information from a single fiducial 304. In other implementations, targets may be arranged at other locations. For example, targets may be arranged at the middle top, middle bottom, and so forth.

The input surface 112 comprises a pattern 306(1). The pattern comprises at least two sets of features 130. The first set of features 130 are low albedo features comprising the low albedo material 212. As a result, the first set of features 130 are optically absorptive to the emitted light 108 used by the ToF assembly 102. The second set of features 130 are high albedo features comprising the high albedo material 204. As a result, the second set of features 130 are optically reflective to the emitted light 108 used by the ToF system.

The pattern 306(1) is predominately made up of the first set of features 130 which are optically absorptive, with a relatively sparse set of the second set of optically reflective features. The pattern 306(1) has a pattern width and a pattern height. A total pattern area is the product of the pattern width and the pattern height. A majority of the pattern area, that is greater than 50%, comprises the first set of features having the low albedo material 212. A minority, which is less than 50%, of the pattern area comprises the second set of features having the high albedo material 204. For example, the first set may cover at least 51% of the pattern area while the second set may cover at most 49% of the pattern area. In other implementations this ratio may be adjusted. For example, the first set of material comprising the low albedo material 212 may exceed 90% of the pattern area.

As described above and illustrated with pattern 306(1), the first set of features may comprise grid blocks while the second set of features may comprise grid lines. Thus, the pattern 306 may be a regular, repeating, or otherwise periodic pattern.

The pattern 306 may also be a non-repeating pattern. A second view 308 depicts a second pattern 306(2). The pattern 306(2) may comprise the first set of features 130(1) as a solid background, mask, or single feature of the low albedo material 212. The second set of features comprising the high albedo material 204 is arranged in a random or pseudorandom pattern across the input surface 112. For example, the pattern 306(2) may be generated by using a pseudorandom function to determine placement locations of one or more of the optically reflective features comprising the high albedo material 204, or, the optically absorptive features comprising the low albedo material 212. In this illustration, the second set of features are squares, however other shapes may be used.

Furthermore, while the features 130 in the pattern are depicted as regular shapes such as squares, circles, and lines, in other implementations the features 130 may have other shapes. For example, the pattern 306(2) may comprise squares, circles, irregular polygons, and so forth.

In some implementations one or more of the fiducials 304 or the pattern 306 may encode machine-readable information. This information may include dimensionality, identity, functionality, and so forth. For example, the fiducial 304 may encode a serial number of the input surface 112. In another example, the pattern 306 may function as a barcode indicating dimensions of the input surface 112. In yet another example, the pattern 306 and fiducials 304 in combination may encode information indicating the input surface 112 is associated with a particular function, such as designating a particular input surface 112 as being associated with the function of receiving drawing input, text input, menu item selection, and so forth.

In some implementations the input surface 112 may be two sided, with each side having a different pattern 306. For example, a first side may comprise the pattern 306(1) while an opposite second side may comprise the pattern 306(2). The user may manually switch, or be directed to switch, such that a particular pattern 306 is presented.

Figure 4:
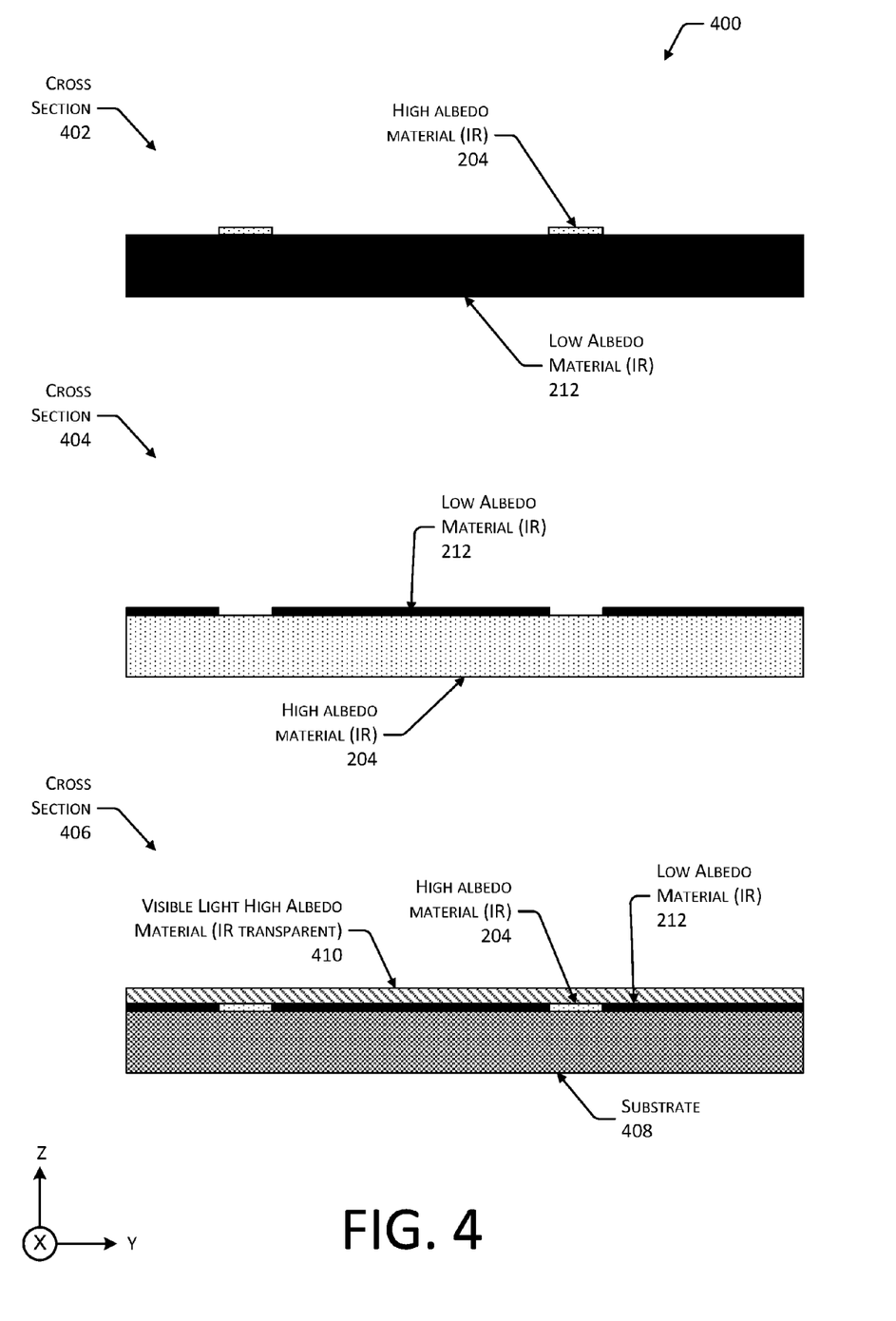
FIG. 4 illustrates cross sectional views of various input surfaces configured to reduce optical multi-path interference.

FIG. 4 illustrates cross sectional views 400 of various input surfaces 112 configured to reduce optical multi-path interference. As used in this discussion, "above" or "atop" indicates on a side facing the ToF assembly 102 during operation.

A first cross section 402 depicts the low albedo material 212 in a continuous layer. Placed atop the low albedo material 212 is the high albedo material 204. In one implementation, the low albedo material 212 may comprise one or more layers of graphene while the high albedo material 204 comprises an aluminum film. The high albedo material 204 is placed to form the pattern 306.

A second cross section 404 depicts the high albedo material 204 in a continuous layer. Deposited atop the high albedo material 204 is the low albedo material 212. For example, the high albedo material 204 may comprise an aluminum film while the low albedo material 212 comprises paint. The low albedo material 212 is placed to form the pattern 306.

A third cross section 406 depicts a substrate 408. Placed on the substrate 408 are the low albedo materials 212 and the high albedo materials 204, configured to form the pattern 306. The substrate 408 may comprise a metal, ceramic, plastic, and so forth. In some implementations, such as illustrated here, an additional layer of a visible light high albedo material 410 which is transparent to infrared but reflective to visible light may be placed atop the pattern 306. This visible light high albedo material 410 may be configured to act as a projection surface, configured to present an image provided by a visible light projector. For example, the visable light high albedo material 410 may be configured to reflect more than 70% of incident visible light, while remaining transmissive to at least 70% of incident infrared light. That is, the visible light may be predominately reflected, while the infrared light may pass through to the underlying features 130. The visable light high albedo material 410 may be placed atop the first material comprising the low albedo material 212, the second material comprising the high albedo material 204, or both. For example, the visable light high albedo material 410 may be configured to be atop the features in the pattern 306 which comprise low albedo material 212, but not be atop the high albedo material 204.

The placing of the features 130 may include one or more of: printing, vapor deposition, lithography, inkjet deposition, embossing, laminating, adhering, or ablating. For example, the cross section 404 may be produced by inkjet deposition of the low albedo material 212 upon the high albedo material 204.

In some implementations not illustrated here, the albedo or reflectivity of the materials may be varied. For example, there may be a third set of features with an intermediate albedo, such as 50% reflectivity. In one pattern, the third set of features may be arranged in the pattern 306 such that the first set, the second set, or both sets are encapsulated or surrounded by the third set of features. For example, a feature comprising the high albedo material 204 may be surrounded or bordered by a medium or intermediate albedo material.

In other implementations, the features 130 may comprise the same material, but differently arranged, configured, or otherwise modified to produce a difference in albedo. In one example, a common material may have portions exposed to high energy light such as ultraviolet wavelengths to alter the common material and change the albedo of those portions. In another example, lithographic features imposed on the material may produce areas which have a high albedo and others which have a lower albedo.

In still another implementation, the features 130 may comprise active materials, or materials subject to change or rearrangement, such that the pattern 306 may be dynamically changed. For example, the input surface 112 may comprise an electrophoretic display. The material within the electrophoretic display may have a high or low albedo, and be configured such that the albedo at a given location or pixel on the input surface 112 may be changed from one state of reflectivity to another. In this implementation, the pattern 306, arrangement of the features 130, and so forth may be varied to improve overall performance. For example, as described below with regard to FIG. 7 in more detail, a user interface input element exclusion zone having a low albedo may be provided to mitigate optical multi-path effects within that zone.

Figure 5:
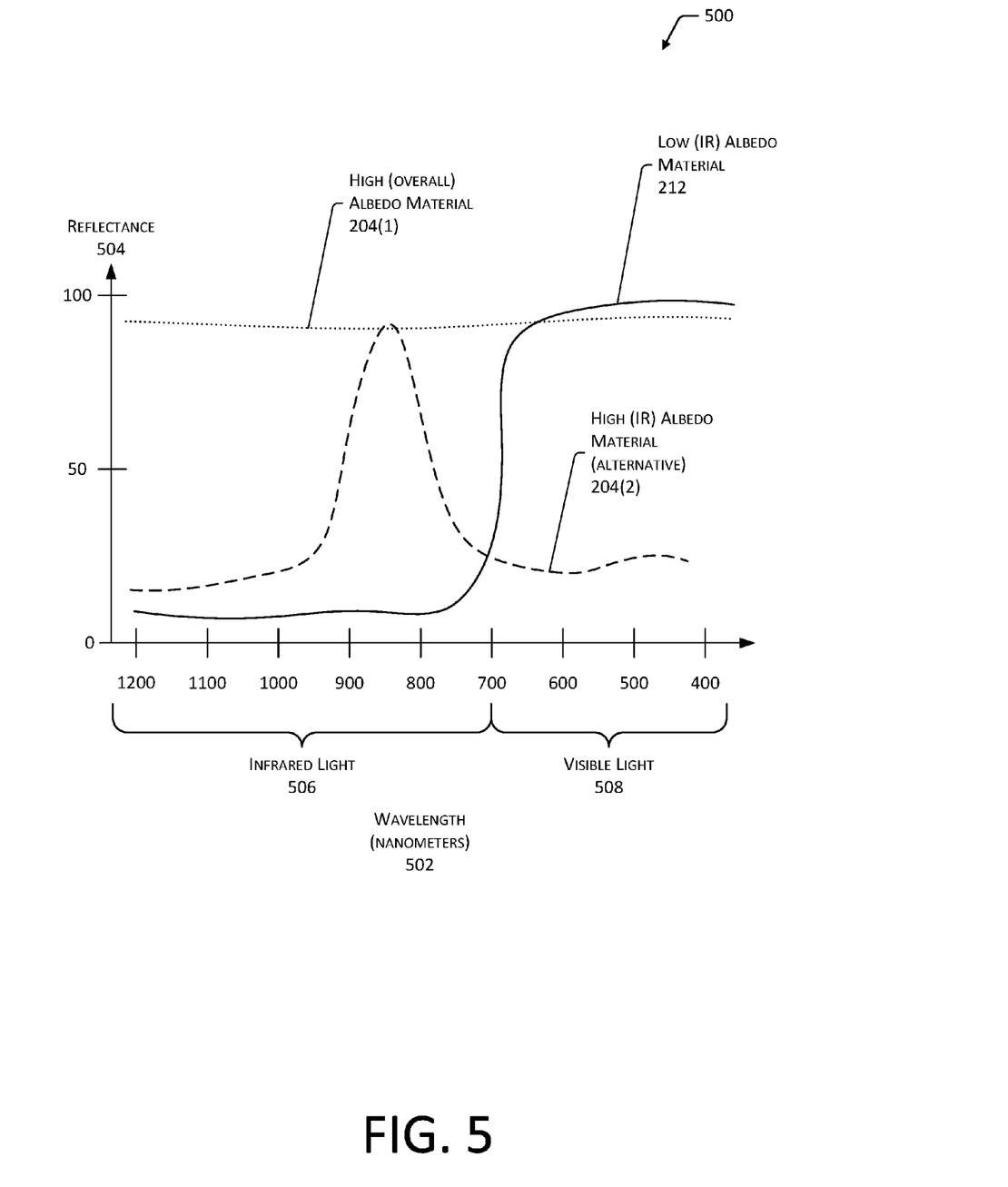
FIG. 5 is a graph illustrating reflectance as a function of wavelength for a high infrared albedo material and a low infrared albedo material.

FIG. 5 is a graph 500 illustrating reflectance as a function of wavelength for the high infrared albedo material 204 and the low infrared albedo material 212. The curves depicted in this graph are provided by way of illustration, and not necessarily as a limitation. In this illustration wavelength 502 is indicated along the horizontal axis, extending from 1200 to 400 nanometers (nm). The vertical axis indicates overall reflectance 504 as a percentage. Reflectance, or albedo, is a measurement of how much light at a given wavelength is diffusely reflected by a material. When illuminated by an emitter 106, a material which is highly reflective or has a high albedo will return more of the emitted light 108 back towards the detector 118 than a material with a low reflectivity or low albedo. A low albedo material may be absorptive at a wavelength or range of wavelengths, in that it absorbs the incident light or re-radiates at a different wavelength. In some implementations a low albedo material may comprise reflective or refractive features which direct at least a portion of the incident light to a light sink or another location.

Infrared light 506 is depicted as wavelengths extending up to about 700 nm, while visible light 508 is depicted as wavelengths from about 700 nm to about 380 nm. In some implementations the exact boundaries of infrared light 506 and visible light 508 may vary. For example, some humans are able to see violet, while others are not.

In this illustration, reflectance curves for the high albedo material 204(1) and 204(2) indicate that within the wavelengths of infrared light 506 the material is highly reflective. For example, the high albedo material 204 may be configured to reflect more than 70% of incident infrared light. In another example, the high albedo material 204 may be configured to reflect more than 80% of incident infrared light. The high albedo material 204(1) may be configured to be overall highly reflective across the infrared light 506 and the visible light 508 wavelengths, such as shown here. In this configuration, the high albedo material 204(1) may be used both as the second set of features with high optical reflectivity in the infrared for the ToF assembly 102, but may also act as a projection surface for a visible light projection. In other implementations, the high albedo material 204(2) may be highly reflective in the infrared light 506 wavelengths, but may not be as reflective in the visible light 508 wavelengths. For example, the curve for the high albedo material 204(2) indicates this material is highly reflective centered at about 850 nm, such as may be used by the ToF assembly 102, but exhibits relatively low reflectance at other wavelengths.

A reflectance curve for the low albedo material 212 is also depicted. As illustrated here the low albedo material 212 has very low reflectance in the wavelengths of infrared light 506. For example, the low albedo material 212 may be configured to reflect less than 40% of incident infrared light. In some implementations the low albedo material 212 may be configured to reflect 30% or less of the incident low albedo material 212. In some implementations the low albedo material 212 may exhibit a high reflectance in the visible light 508.

In some implementations the particular reflectance curves may have one or more wavelengths of peak reflectivity corresponding to the wavelength used by the ToF assembly 102. The curves are provided here by way of illustration, and not as a limitation.

Figure 6:
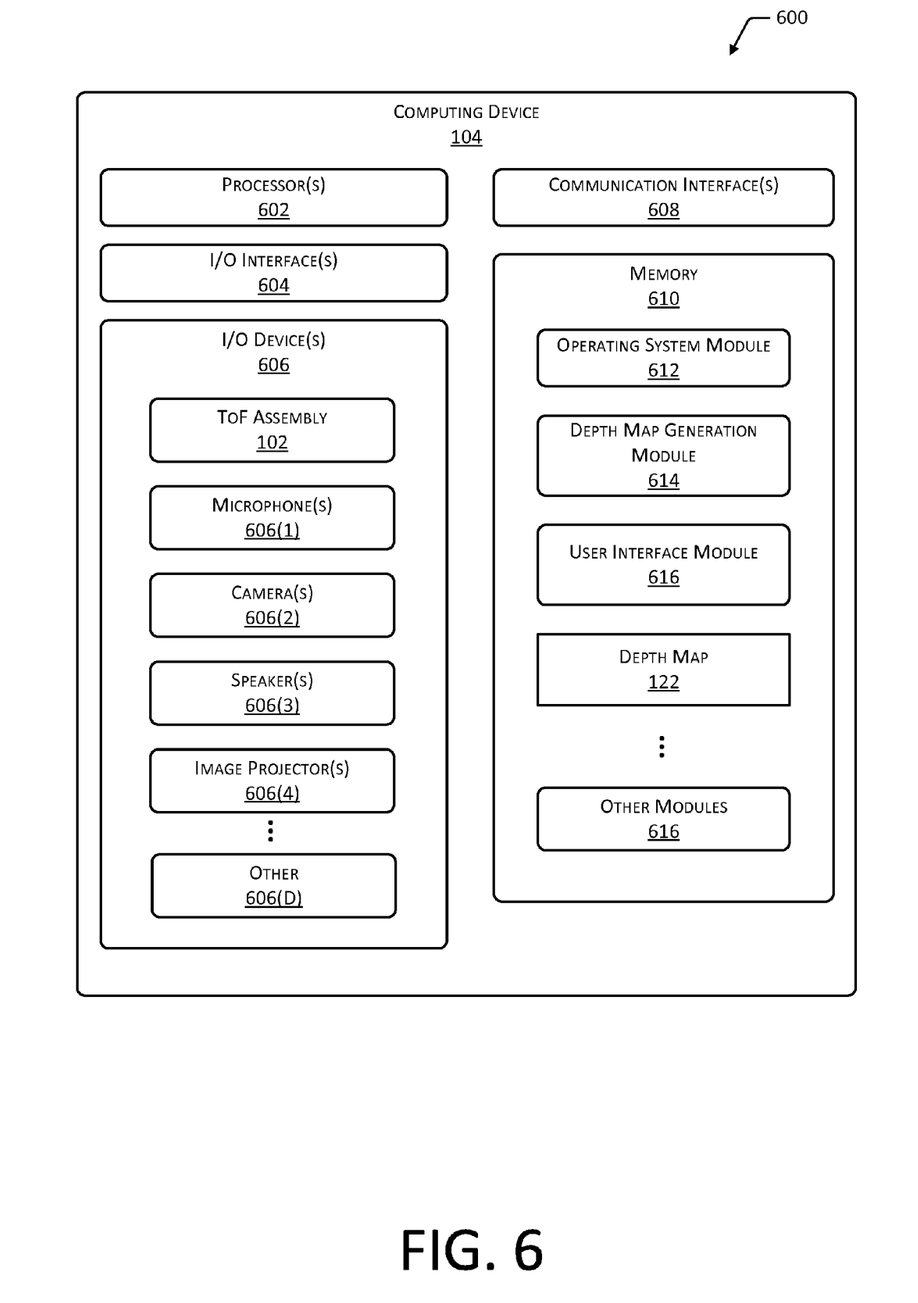
FIG. 6 illustrates a block diagram of a computing device configured to provide a projected user interface and determine user input based on a depth map.

FIG. 6 illustrates a block diagram 600 of the computing device 104. The computing device 104 may be configured to determine user input based on the depth map 122, provide a projected user interface onto the input surface 112, and other functions.

The computing device 104 may include one or more processors 602 configured to execute one or more stored instructions. The processors 602 may comprise one or more cores. The computing device 104 may include one or more input/output ("I/O") interface(s) 604 to allow the processor 602 or other portions of the computing device 104 to communicate with other devices. The I/O interfaces 604 may comprise inter-integrated circuit ("I2C"), serial peripheral interface bus ("SPI"), Universal Serial Bus ("USB") as promulgated by the USB Implementers Forum, RS-232, high definition multimedia interface ("HDMI"), and so forth.

The I/O interface(s) 604 may couple to one or more I/O devices 606. The I/O devices 606 may include input devices such as one or more of the ToF assembly 102, microphones 606(1), cameras 606(2), structured light system, radar/sonar, touch sensors, buttons, and so forth.

The I/O devices 606 may also include output devices such as one or more of a display, speakers 606(3), image projectors 606(4), haptic output devices and so forth. The image projectors 606(4) may include digital light modulators, liquid crystal display projectors, laser projectors, and so forth. The image projectors 606(4) may be configured to project an image onto the input surface 112, or other surfaces within the environment.

In some embodiments, the I/O devices 606 may be physically incorporated within the computing device 104 or may be externally placed. For example, a tablet computer, smartphone, laptop, wearable computer, or other devices may be used as an I/O device 606 for the computing device 104.

The computing device 104 may also include one or more communication interfaces 608. The communication interfaces 608 may be configured to provide communications between the computing device 104 and other devices, such as the ToF assembly 102, routers, access points, and so forth. The communication interfaces 608 may include personal area networks ("PANs"), wired and wireless local area networks ("LANs"), wide area networks ("WANs"), and so forth. For example, the communication interfaces 608 may be configured to couple to Ethernet, Wi-Fi®, Bluetooth®, ZigBee®, and so forth. The communication interfaces 608 may be used to provide communication with a wide area network such as the Internet and one or more servers providing cloud services.

The computing device 104 may also include one or more busses or other internal communications hardware or software that allow for the transfer of data between the various modules and components of the computing device 104.

As shown in FIG. 6, the computing device 104 includes one or more memories 610. The memory 610 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 610 provides storage of computer readable instructions, data structures, program modules, and other data for the operation of the computing device 104.

The memory 610 may include at least one operating system (OS) module 612. The OS module 612 is configured to manage hardware resource devices such as the I/O interfaces 604, the I/O devices 606, the communication interfaces 608, and provide various services to applications or modules executing on the processors 602. Also stored in the memory 610 may be one or more of the modules described next. These modules may be executed as foreground applications, background tasks, daemons, and so forth.

A depth map generation module 614 is configured to receive time-of-flight data from the ToF assembly 102 and generate the depth map 122. For example, the ToF assembly 102 may provide a stream of raw data in an array, which is then received by the depth map generation module 614 and processed to form the depth map 122. The depth map generation module 614 may apply one or more techniques to remove extraneous data, correct for possible multi-path interference from known locations of the high albedo features 130, and so forth. For example, given a known location of the high albedo fiducial 304, the depth map generation module 614 may be configured to disregard or reduce the consideration of data for points proximate to the fiducial 304.

A user interface module 616 is configured to maintain a user interface using input devices such as the ToF assembly 102 and output devices such as the one or more speakers 606(3), image projectors 606(4), other input devices 606(D), and so forth. The user interface module 616 may be configured to generate images for projection by the image projector 606(4). For example, the images may include graphical user interface elements. The image of the user interface may be projected onto the input surface 112. The user interface module 616 may provide other output, such as audible, haptic, olfactory, and so forth from respective output devices.

The user interface module 616 may be configured to process data, such as the depth map 122, to determine user inputs. These user inputs may be responsive to the user interface projected or printed on the input surface 112, and may be based on the depth map 122.

These user inputs may include the positions, motions, or orientations of objects in the sensor field of view 120. The user inputs may be associated with executing particular instructions. For example, the user input may comprise the user touching the input surface 112 proximate to, or at, a location where a graphical user interface element of a projected user interface has been projected onto the input surface 112.

The user interface module 616 may also be configured to identify one or more of the fiducials 304 in the time-of-flight data, such as in the depth map 122. Based at least in part on the identified one or more fiducials 304, a pose of the input surface 112 in space relative to the ToF assembly 102 may be determined. This pose information may be used during the determination of the user inputs to correct for a non-orthogonal orientation between the ToF assembly 102 and the input surface 112. For example, the user interface module 616 may modify the image of the user interface to be projected based at least in part on the pose, such that the image presented on the input surface 112 appears to be undistorted to the user, despite the non-orthogonal orientation between the input surface 112 and the image projector 606(4).

Other modules 616 may also be provided in the memory 610. For example, a speech recognition module may be configured to convert human speech into data suitable for processing by one or more other modules.

In some implementations one or more of the modules or the functions described above may be stored, executed, or otherwise distributed to one or more devices. These devices may be external devices such as cloud servers which are accessible using the wide area network. For example, the speech recognition module may be executed, for which data is transferred to an external server for processing, and the results of that processing are received and used by the computing device 104.

Figure 7:
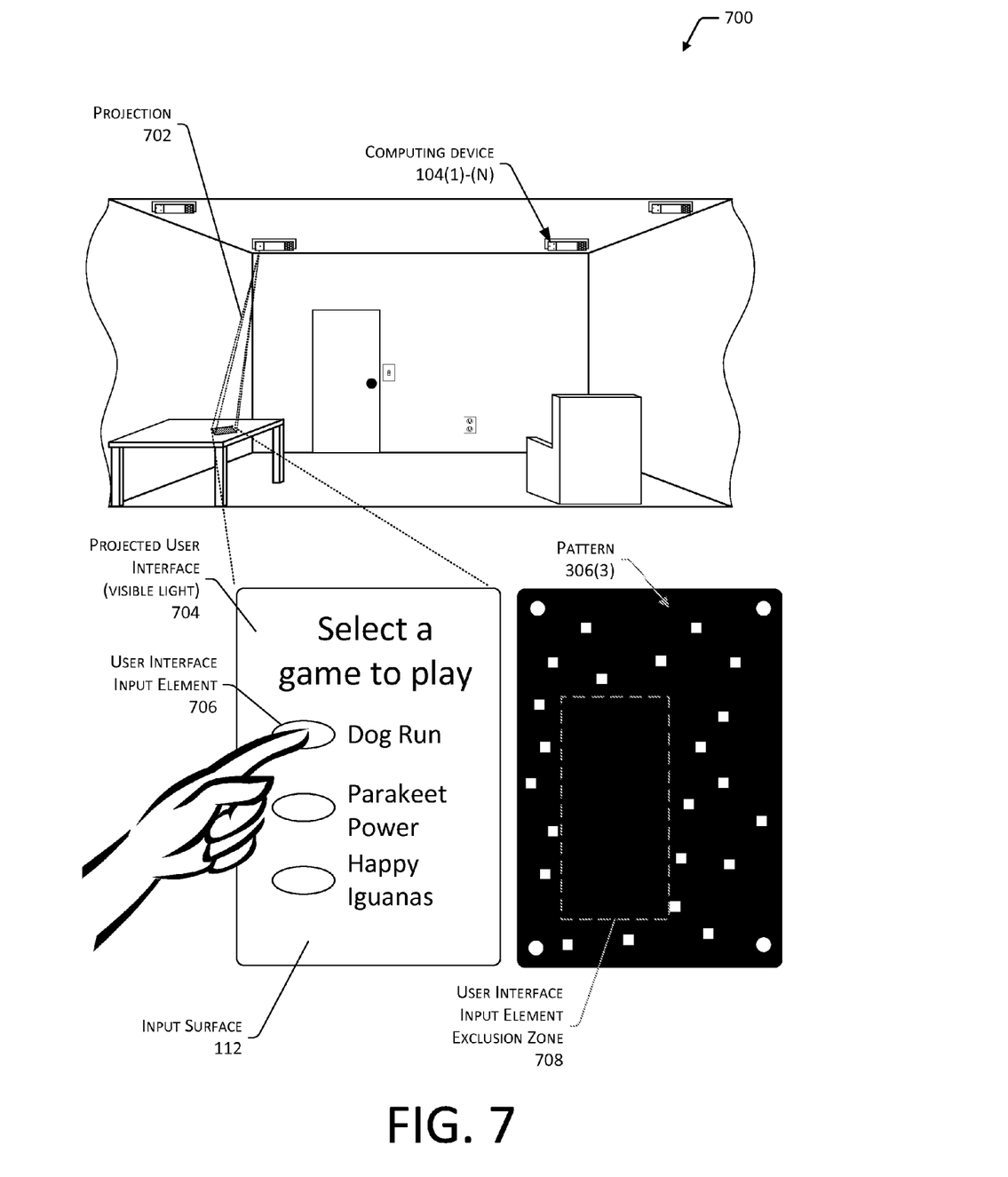
FIG. 7 illustrates an environment in which the projected user interface is projected onto the input surface configured to reduce optical multi-path interference.

FIG. 7 illustrates an environment 700 in which a projected user interface is projected onto the input surface 112 configured to reduce optical multi-path interference. The computing devices 104(1), 104(2), . . . , 104(N) or other devices such as ToF assemblies 102, image projectors 606(4), and so forth may be arranged at one or more locations within an environment, such as a room. As illustrated here, at least a portion of these devices are arranged on the ceiling of the room. An image projector 606(4) is configured to provide a projection 702 using visible light to locations within the room. As shown here, the projection 702 is targeted to fall at least upon an input surface 112. In this illustration the input surface 112 is portable, in that it may be easily moved by the user. In other implementations the input surface 112 may be mounted to, or part of, a wall, table, floor, and so forth. For example, in a classroom, the input surface 112 may comprise a wall used as a whiteboard, projection surface, and so forth.

The projection 702 includes a projected user interface 704. This projected user interface 704 may include user interface input elements 706 such as buttons, scroll bars, sliders, and so forth. In this illustration the projected user interface 704 comprises options to select a game to play, with user interface input elements 706 provided for each of the options. The user interface module 616 may be configured to detect the presence and orientation of a finger at a location proximate to, or overlapping, the user interface input elements 706. Once detected, a corresponding action, such as selecting or executing the game associated with the user interface input element 706 may be performed by the computing device 104.

To reduce or eliminate optical multi-path interference due to reflections from the features 130 comprising the high albedo material 204, in some implementations the pattern 306 may be configured for particular user input. In this illustration, the pattern 306(3) as apparent in infrared is depicted. This pattern 306(3) includes one or more user interface input element exclusion zones 708. These zones 708 are configured to provide an area of low albedo material 212 free from the high albedo features 130. For example, as depicted here, the user interface input element exclusion zone 708 indicated by a broken line is free from the second set of features comprising high albedo material 204.

As described above with regard to FIG. 4, the pattern 306 on the input surface 112 may be fixed or may be variable. The pattern 306 may be fixed in that it is printed or otherwise deposited into a substrate to form the input surface 112. The pattern 306 may be variable when provided by action of an electrophoretic display or material, phase change material liquid crystals, and so forth. For example, using an electrophoretic display the pattern 306 may be dynamically adjusted to place the user interface input element exclusion zone 708 at different positions on the input service 112.

Figure 8:
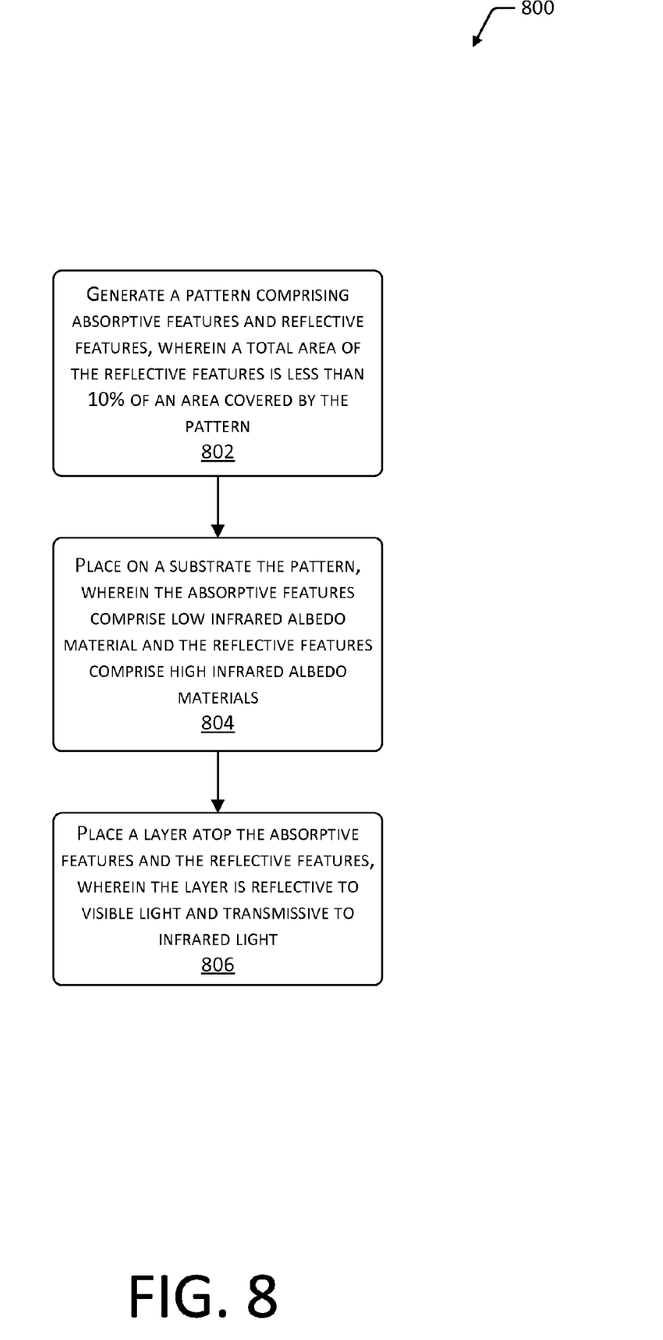
FIG. 8 is a flow diagram of a process of generating the pattern configured to reduce optical multi-path interference and placing the pattern on a substrate.

FIG. 8 is a flow diagram of a process of generating the pattern configured to reduce optical multi-path interference and placing the pattern on a substrate.

Block 802 generates a pattern 306 having a total pattern area. Where the pattern 306 is rectangular, the total pattern area may be calculated as a product of the pattern width and the pattern height. The pattern 306 comprises a first set of optically absorptive features 130 and a second set of optically reflective features 130, as described above. A total area of the second set of reflective features 130 is less than a total area of the first set of absorptive features 130. In one implementation the total area of the second set of reflective features may be less than 10% of the total pattern area.

In one implementation, the generated pattern 306 may have the first set of the optically absorptive features arranged as grid blocks, while the second set of the optically reflective features are arranged as grid lines. In another implementation, the pattern 306 may be generated using a pseudorandom function to place one or more of the optically reflective features or the optically absorptive features within the pattern area. For example, the pseudorandom function may place the second set of optically reflective features in a pseudorandom pattern across an optically absorptive field.

The generation of the pattern 306 may be configured such that the pattern 306 generated is suitable for a particular use. A block may access data indicative of arrangement of one or more user interface input elements 706 in the total pattern area. For example, data indicating a map of a graphical user interface and locations of input buttons may be retrieved. A block may then arrange one or more of the first set of optically absorptive features 130 or the second set of the optically reflective features 130 in the pattern 306, such that the optically absorptive features 130 are proximate to the user interface input elements 706. The second set of optically reflective features 130 may be arranged away from, or distal to, the user interface input elements 706, such that reflections from these features will not introduce multi-path interference effects. For example, the user interface input element exclusion zone 708 may be provided during generation of the pattern 306. The zone 708 is free from the second set of optically reflective features.

Block 804 places, on the substrate 408 the pattern 306 comprising the first set of absorptive features and the second set of reflective features. As described above, the first set of optically absorptive features comprise low infrared albedo material 212 and the second set of reflective features comprise high infrared albedo materials 204. In other implementations, block 804 may place or form the pattern 306 in other ways. For example, the second set of features comprising high albedo material 204 may be deposited on a low albedo material 212, or vice versa.

As described above with regard to FIG. 4, the placing may comprise one or more of: printing, vapor deposition, lithography, inkjet deposition, embossing, laminating, adhering, or ablating. In some implementations, the placement of the features 130 may involve modification or change to a common material. For example, during fabrication light may be applied to particular areas of material to form different albedos.

Block 806 places a layer atop one or more of the absorptive features 130 or the reflective features 130. The layer may comprise the high albedo material 410 described above, which is configured to be reflective to visible light and transmissive to infrared light. This layer enables use of the input surface 112 as a projection surface, such as to display the projected user interface 704 described above. In some implementations the layer may be printed with controls, icons, or other symbols using ink or other materials which are transparent to the wavelengths used by the ToF assembly 102 but visible in visible light wavelengths.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A device comprising:
    a first material configured to reflect less than 40% of incident infrared light at a designated wavelength;
    a second material configured to reflect more than 70% of incident infrared light at the designated wavelength; and
    an input surface having a pattern with a total pattern area, the pattern comprising:
        the first material configured in a first plurality of features having a first area of more than 51% of the total pattern area;
        the second material configured in a second plurality of features having a second area of less than 49% of the total pattern area; and
        wherein the first plurality of features and the second plurality of features are interspersed with one another and the pattern reduces multi-path interference by absorbing incident infrared light at the designated wavelength.

2. The device of claim 1, further comprising:
    a third material configured to reflect more than 70% of incident visible light having a wavelength different than the designated wavelength, wherein the third material is transmissive to at least 70% of the incident infrared light and is placed atop one or more of the first material or the second material, and wherein the third material is configured to act as a projection surface for enabling visible light images to be projected thereon.

3. The device of claim 1, wherein:
    the first material is further configured to reflect more than 70% of incident visible light,
    the second material is further configured to reflect more than 70% of incident visible light, and
    wherein one or more of the first material or the second material is configured to act as a projection surface for enabling visible light images to be projected thereon.

4. The device of claim 1, wherein at least a portion of the first plurality of features comprises one or more fiducials disposed at one or more locations within the pattern, at least a portion of the one or more fiducials being configured to reflect more than 70% of incident infrared light at the designated wavelength for determining one or more of a distance or a pose of the input surface.

5. The device of claim 1, wherein the pattern comprises a grid of grid blocks and grid lines, and further wherein the grid blocks comprise the first material and are configured to absorb incident infrared light reflected from an object, and the grid lines comprise the second material and are configured to reflect incident infrared light for determining one or more of a distance or a pose of the input surface.

6. The device of claim 2, wherein the incident infrared light has a wavelength ranging from 700 nanometers to 1200 nanometers, and the incident visible light has a wavelength ranging from 700 nanometers to 360 nanometers.

7. A method comprising:
    generating a pattern having a total pattern area, the pattern comprising optically absorptive features and optically reflective features, wherein a total area of the optically reflective features is less than 10% of the total pattern area; and
    placing the pattern on a substrate, wherein the optically absorptive features comprise low infrared albedo material and the optically reflective features comprise high infrared albedo materials and the pattern reduces multi-path interference from infrared light by absorbing at least a portion of the infrared light.

8. The method of claim 7, wherein the pattern comprises the optically absorptive features arranged as grid blocks configured to absorb infrared light and the optically reflective features arranged as grid lines configured to reflect infrared light for determining one or more of a distance or a pose of the pattern.

9. The method of claim 7, the generating the pattern comprising using a pseudorandom function to place one or more of the optically reflective features or the optically absorptive features.

10. The method of claim 7, further comprising:
    placing a layer atop the optically absorptive features and the optically reflective features, wherein the layer is reflective to visible light and transmissive to infrared light, the layer being configured to act as a projection surface for images.

11. The method of claim 7, the generating the pattern comprising:
    accessing data indicative of arrangement of one or more user interface input elements in the total pattern area; and
    arranging one or more of the optically absorptive features or the optically reflective features in the pattern, wherein the optically absorptive features are proximate to the one or more user interface input elements for absorbing infrared light reflected from an object proximate to the one or more user interface elements, and the optically reflective features are distal to the one or more user interface input elements.

12. The method of claim 7, the generating the pattern comprising:
    arranging the optically absorptive features to form one or more user interface input element exclusion zones in the pattern, wherein the one or more user interface input element exclusion zones are free from the optically reflective features to reduce multi-path interference from reflected infrared light in the one or more user interface input element exclusion zones.

13. The method of claim 7, the placing comprising one or more of: printing, vapor deposition, lithography, inkjet deposition, embossing, laminating, adhering, or ablating.

14. A system comprising:
    an input surface configured to interact with emitted light, the input surface comprising:
        a pattern having a total pattern area comprising areas of a first material and a second material, wherein:

the first material is configured to reflect less than 30% of incident infrared light;

the second material is configured to reflect more than 80% of incident infrared light; and the total pattern area comprises 90% or more by area of the first material and the pattern reduces multipath interference from emitted light by absorbing at least a portion of the emitted light.

15. The system of claim 14, further comprising:

an infrared time-of-flight assembly configured to generate time-of-flight data, the infared time-of-flight assembly comprising:

an emitter configured to produce infrared emitted light, wherein a first portion of the infrared emitted light is absorbed by the first material and a second portion of the infrared emitted light is reflected by the second material; and     an image sensor configured to detect the second portion of the infrared emitted light.

16. The system of claim 15, further comprising:

a computing device coupled to the infrared time-of-flight assembly, the computing device comprising:

at least one memory storing computer-executable instructions; and     at least one processor configured to access the infrared time-of-flight assembly and the at least one memory, the at least one processor configured to execute the computer-executable instructions to cause the at least one processor to:

receive the time-of-flight data from the infrared time-of-flight assembly;

determine time-of-flight data associated with the second portion of the infrared emitted light reflected by the second material; and         generate a depth map based on the determined time-of-flight data.

17. The system of claim 16, wherein the pattern comprises one or more fiducials arranged at one or more corners of the input surface, the fiducials comprising the second material, the computer-executable instructions further being configured to cause the at least one processor to:

identify at least one of the one or more fiducials in the time-of-flight data; and     determine, based at least in part on the identified at least one of the one or more fiducials, a pose of the input surface in space relative to the infrared time-of-flight assembly.

18. The system of claim 17, further comprising a visible light image projector configured to project an image of a user interface onto the input surface, the input surface being configured to reflect at least 70% of incident visible light, the computer-executable instructions further being configured to modify the image based at least in part on the pose of the input surface.

19. The system of claim 18, the computer-executable instructions further being configured to cause the at least one processor to:

determine user input responsive to the user interface based on the depth map.

20. The system of claim 14, wherein the input surface is configured to be mounted to one or more of a wall, a table, or a floor.

\* \* \* \* \*